United States Patent
Gao et al.

(10) Patent No.: US 10,929,497 B2
(45) Date of Patent: Feb. 23, 2021

(54) REPLACING A WEB PAGE WHILE MAINTAINING A COMMUNICATION LINK

(71) Applicant: Huawei Device Co., Ltd., Dongguan (CN)

(72) Inventors: Wenmei Gao, Beijing (CN); Yahui Wang, Beijing (CN); Hao Jing, Beijing (CN); Xiaoqiang Lv, Beijing (CN); Shunan Fan, Beijing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 328 days.

(21) Appl. No.: 14/584,962

(22) Filed: Dec. 29, 2014

(65) Prior Publication Data

US 2015/0113382 A1    Apr. 23, 2015

Related U.S. Application Data

(63) Continuation of application No. PCT/CN2013/082209, filed on Aug. 23, 2013.

(51) Int. Cl.
*G06F 16/958*  (2019.01)
*G06F 16/957*  (2019.01)

(52) U.S. Cl.
CPC .......... *G06F 16/958* (2019.01); *G06F 16/957* (2019.01)

(58) Field of Classification Search
CPC .................. G06F 17/30864; G06F 17/30899
See application file for complete search history.

(56) References Cited

U.S. PATENT DOCUMENTS

| | | | | |
|---|---|---|---|---|
| 5,907,681 A | * | 5/1999 | Bates | G06F 17/30899 707/E17.119 |
| 5,969,714 A | * | 10/1999 | Butcher | H04N 21/47202 348/E7.071 |
| 6,401,125 B1 | * | 6/2002 | Makarios | H04L 67/14 709/219 |
| 6,732,183 B1 | * | 5/2004 | Graham | H04L 65/4084 348/722 |
| 6,738,804 B1 | | 5/2004 | Lo | |

(Continued)

FOREIGN PATENT DOCUMENTS

| | | |
|---|---|---|
| CN | 1369826 A | 9/2002 |
| CN | 1588864 A | 3/2005 |

(Continued)

OTHER PUBLICATIONS

"Retain;" Dictionary by Merriam-Webster; Jan. 21, 2012; www.merriam-webster.com/dictionary/retain; 2 Pages.*

(Continued)

*Primary Examiner* — Andrew R Dyer
(74) *Attorney, Agent, or Firm* — Conley Rose, P.C.

(57) ABSTRACT

Embodiments of the present invention provide a web page processing method, including: receiving an operation instruction on a first page, where the operation instruction may include a page replacing instruction; and controlling a first resource included in the first page to remain in a connected state, where the first resource is specified in advance as a resource to be retained. Correspondingly, the embodiments of the present invention further provide a communications device. The embodiments of the present invention can improve robustness of page browsing.

19 Claims, 4 Drawing Sheets

(56) References Cited

U.S. PATENT DOCUMENTS

| | | | |
|---|---|---|---|
| 7,010,582 B1* | 3/2006 | Cheng | H04L 63/0815 709/219 |
| 7,617,278 B1* | 11/2009 | Edelman | H04L 65/4092 709/203 |
| 7,640,512 B1 | 12/2009 | Appling | |
| 8,108,527 B1* | 1/2012 | Nara | H04L 65/4084 709/227 |
| 8,406,390 B1* | 3/2013 | Halferty | H04M 3/42221 379/202.01 |
| 8,775,556 B1* | 7/2014 | Matthews | G06F 16/958 709/217 |
| 9,146,656 B1* | 9/2015 | Srinivasan | G06F 16/957 |
| 10,404,658 B1* | 9/2019 | Ludwig | G06F 16/958 |
| 10,789,654 B1* | 9/2020 | Eftekhari | H04L 67/10 |
| 2002/0035617 A1* | 3/2002 | Lynch | G06F 17/30569 709/219 |
| 2002/0065875 A1* | 5/2002 | Bracewell | G06F 9/463 709/203 |
| 2003/0093585 A1* | 5/2003 | Allan | H04L 67/02 719/330 |
| 2003/0158975 A1* | 8/2003 | Frank | G06F 16/9577 719/331 |
| 2004/0165007 A1* | 8/2004 | Shafron | G06F 9/451 715/781 |
| 2005/0108299 A1* | 5/2005 | Nakajima | G06F 16/9574 |
| 2006/0218500 A1* | 9/2006 | Sauve | G06F 3/0481 715/767 |
| 2007/0050718 A1* | 3/2007 | Moore | G06F 3/0482 715/744 |
| 2007/0299928 A1* | 12/2007 | Kohli | H04L 63/10 709/217 |
| 2008/0040758 A1* | 2/2008 | Beetcher | H04N 5/44543 725/81 |
| 2008/0092047 A1* | 4/2008 | Fealkoff | G06F 16/78 715/716 |
| 2009/0235236 A1 | 9/2009 | Nickerson et al. | |
| 2009/0287790 A1* | 11/2009 | Upton | H04L 12/1827 709/208 |
| 2010/0064220 A1* | 3/2010 | Sankaranarayan | H04N 21/8586 715/719 |
| 2011/0023079 A1* | 1/2011 | Schultz | H04H 20/59 725/145 |
| 2011/0126102 A1* | 5/2011 | Archer | H04N 21/4147 715/716 |
| 2011/0126134 A1* | 5/2011 | Macken | G06F 16/958 715/760 |
| 2011/0202828 A1 | 8/2011 | Wan | |
| 2012/0096073 A1* | 4/2012 | Elwood | G06F 16/957 709/203 |
| 2012/0158825 A1* | 6/2012 | Ganser | H04L 67/02 709/203 |
| 2012/0254729 A1 | 10/2012 | Wan | |
| 2012/0297429 A1 | 11/2012 | Reed et al. | |
| 2012/0317474 A1* | 12/2012 | Parreira | G06F 16/986 715/234 |
| 2013/0181897 A1 | 7/2013 | Izumi | |

FOREIGN PATENT DOCUMENTS

| | | |
|---|---|---|
| CN | 1987851 A | 6/2007 |
| CN | 101504648 A | 8/2009 |
| CN | 102117290 A | 7/2011 |
| CN | 102469125 A | 5/2012 |
| CN | 102541599 A | 7/2012 |
| CN | 102662581 A | 9/2012 |
| CN | 102905181 A | 1/2013 |
| CN | 103154858 A | 6/2013 |
| CN | 103177115 A | 6/2013 |
| WO | WO 02/084534 A2 | 10/2002 |

OTHER PUBLICATIONS

"Refresh;" Dictionary by Merriam-Webster; Jan. 27, 2012; www.merriam-webster.com/dictionary/refresh; 2 Pages.*

Machine Translation and Abstract of Chinese Publication No. CN103177115, dated Jun. 26, 2013, 22 pages.

* cited by examiner

REPLACING A WEB PAGE WHILE MAINTAINING A COMMUNICATION LINK

CROSS REFERENCE AND RELATED APPLICATIONS

This application is a continuation of International Application No. PCT/CN2013/082209, filed on Aug. 23, 2013, which is incorporated herein by reference in its entirety.

TECHNICAL FIELD

The present invention relates to the field of the Internet, and in particular, to a web page processing method and device.

BACKGROUND

At present, the Internet has already become an indispensable part of people's life. People can communicate with friends on the Internet, or obtain information on the Internet, and also can watch a video on the Internet or the like. People generally implement the foregoing technologies by using a browser. A browser can support many operations, such as the forward, back, refresh, close, and other operations, and people may implement these operations by pressing a virtual key displayed in the browser or a key on a keyboard. When people use a browser in this way, some misoperations inevitably occur. For example, a user accidentally presses a refresh key on a keyboard when entering data on a registration page; or some necessary operations result in reloading of a page currently displayed in the browser. For example, on a video display page, when resources except a video on the page need to be refreshed, people need to perform a refresh operation; however, a conventional refresh operation is performed to refresh the entire page, which means that the video needs to be reloaded. In conclusion, conventional page browsing has poor robustness.

SUMMARY

Embodiments of the present invention provide a web page processing method and device, which can improve robustness of page browsing.

According to a first aspect, an embodiment of the present invention provides a web page processing method, including:

receiving an operation instruction on a first page, where the operation instruction may include a page replacing instruction; and controlling a first resource included in the first page to remain in a connected state, where the first resource is specified in advance as a resource to be retained.

In a first possible implementation manner of the first aspect, after the controlling a first resource included in the first page to remain in a connected state, the method further includes:

obtaining a second resource according to the operation instruction, and displaying the second resource, where the second resource is different from the first resource.

With reference to any one of the foregoing implementation manners of the first aspect, in a second possible implementation manner of the first aspect, the first page includes:

a page including a real-time transmitted resource, a transaction page, and a registration page.

With reference to any one of the foregoing implementation manners of the first aspect, in a third possible implementation manner of the first aspect, the page replacing instruction includes:

a back operation instruction, a refresh operation instruction, a hyperlink creation operation instruction, or a close operation instruction.

With reference to the third possible implementation manner of the first aspect, in a fourth possible implementation manner of the first aspect, the operation instruction is the back operation instruction, where the controlling a first resource included in the first page to remain in a connected state includes:

controlling all resources of the first page to remain in the connected state; and the obtaining a second resource according to the operation instruction, and displaying the second resource includes:

obtaining, according to the operation instruction, a page resource of a page address with a latest runtime in a window history list of a browser running the first page, and displaying the page resource.

With reference to the third possible implementation manner of the first aspect, in a fifth possible implementation manner of the first aspect, the operation instruction is the refresh operation instruction, and the first page is the page including the real-time transmitted resource, where the controlling a first resource included in the first page to remain in a connected state includes:

controlling the real-time transmitted resource of the first page to remain in the connected state; and the obtaining a second resource according to the operation instruction, and displaying the second resource includes:

updating a resource, except the real-time transmitted resource, on the first page according to the operation instruction, and displaying the updated resource and the real-time transmitted resource on the first page.

With reference to the third possible implementation manner of the first aspect, in a sixth possible implementation manner of the first aspect, the operation instruction is the refresh operation instruction, the first page is a web real-time communication page, and a media stream object of the web real-time communication page is a real-time transmitted resource, where the controlling a first resource included in the first page to remain in a connected state includes:

controlling a media stream session connection object of the first page and the media stream object to remain in the connected state, and saving a handle of a buffer corresponding to the media stream; and the obtaining a second resource according to the operation instruction, and displaying the second resource includes:

updating a resource, except the media stream session connection object and the media stream, on the first page according to the operation instruction, displaying the obtained resource on the first page, and assigning the handle to a video element or an audio element of the first page.

With reference to the third possible implementation manner of the first aspect, in a seventh possible implementation manner of the first aspect, the operation instruction is the hyperlink creation operation instruction, where the controlling a first resource included in the first page to remain in a connected state includes:

controlling all resources of the first page to remain in the connected state; and the obtaining a second resource according to the operation instruction, and displaying the second resource includes:

obtaining, according to the operation instruction, a page resource connected to a resource corresponding to the operation instruction, adding, to a page of the page resource, a parameter used for opening the page resource in a new label, and opening the page resource in the new label.

According to a second aspect, an embodiment of the present invention provides a communications device, including: a receiving unit and a control unit, where:

the receiving unit is configured to receive an operation instruction on a first page, where the operation instruction may include a page replacing instruction; and the control unit is configured to control, according to the operation instruction, a first resource included in the first page to remain in a connected state, where the first resource is specified in advance as a resource to be retained.

In a first possible implementation manner of the second aspect, the device further includes:

an obtaining unit, configured to obtain a second resource according to the operation instruction, and display the second resource, where the second resource is different from the first resource.

With reference to any one of the foregoing implementation manners of the second aspect, in a second possible implementation manner of the second aspect, the first page includes:

a page including a real-time transmitted resource, a transaction page, and a registration page.

With reference to any one of the foregoing implementation manners of the second aspect, in a third possible implementation manner of the second aspect, the page replacing instruction includes:

a back operation instruction, a refresh operation instruction, a hyperlink creation operation instruction, or a close operation instruction.

With reference to the third possible implementation manner of the second aspect, in a fourth possible implementation manner of the second aspect, the operation instruction is the back operation instruction, where the control unit is further configured to control all resources of the first page to remain in the connected state; and the obtaining unit is further configured to obtain, according to the operation instruction, a page resource of a page address with a latest runtime in a window history list of a browser running the first page, and display the page resource.

With reference to the third possible implementation manner of the second aspect, in a fifth possible implementation manner of the second aspect, the operation instruction is the refresh operation instruction, and the first page is the page including the real-time transmitted resource, where the control unit is further configured to control the real-time transmitted resource of the first page to remain in the connected state; and the obtaining unit is further configured to update a resource, except the real-time transmitted resource, on the first page according to the operation instruction, and display the updated resource and the real-time transmitted resource on the first page.

With reference to the third possible implementation manner of the second aspect, in a sixth possible implementation manner of the second aspect, the operation instruction is the refresh operation instruction, the first page is a web real-time communication page, and a media stream object of the web real-time communication page is a real-time transmitted resource, where the control unit is further configured to control a media stream session connection object of the first page and the media stream object to remain in the connected state, and save a handle of a buffer corresponding to the media stream; and the obtaining unit is further configured to update a resource, except the media stream session connection object and the media stream, on the first page according to the operation instruction, display the obtained resource on the first page, and assign the handle to a video element or an audio element of the first page.

With reference to the third possible implementation manner of the second aspect, in a seventh possible implementation manner of the second aspect, the operation instruction is the hyperlink creation operation instruction, where the control unit is further configured to control all resources of the first page to remain in the connected state; and the obtaining unit is further configured to obtain, according to the operation instruction, a page resource connected to a resource corresponding to the operation instruction, add, to a page of the page resource, a parameter used for opening the page resource in a new label, and open the page resource in the new label.

According to a third aspect, an embodiment of the present invention provides a communications device, including: a network interface, a memory, a communications bus, and a processor coupled to the network interface and the memory through the communications bus, where the memory is configured to store a group of program code, and the processor is configured to invoke a program stored in the memory, to perform the following operations:

receiving an operation instruction on a first page, where the operation instruction may include a page replacing instruction; and controlling a first resource included in the first page to remain in a connected state, where the first resource is specified in advance as a resource to be retained.

In a first possible implementation manner of the third aspect, after performing the operation of controlling a first resource included in the first page to remain in a connected state, the processor is further configured to perform the following operation:

obtaining a second resource according to the operation instruction, and displaying the second resource, where the second resource is different from the first resource.

With reference to any one of the foregoing implementation manners of the third aspect, in a second possible implementation manner of the third aspect, the first page includes:

a page including a real-time transmitted resource, a transaction page, and a registration page.

With reference to any one of the foregoing implementation manners of the third aspect, in a third possible implementation manner of the third aspect, the page replacing instruction includes:

a back operation instruction, a refresh operation instruction, a hyperlink creation operation instruction, or a close operation instruction.

With reference to the third possible implementation manner of the third aspect, in a fourth possible implementation manner of the third aspect, the operation instruction is the back operation instruction, where the operation, which is performed by the processor, of controlling a first resource included in the first page to remain in a connected state includes:

controlling all resources of the first page to remain in the connected state; and the operation, which is performed by the processor, of obtaining a second resource according to the operation instruction, and displaying the second resource includes:

obtaining, according to the operation instruction, a page resource of a page address with a latest runtime in a window history list of a browser running the first page, and displaying the page resource.

With reference to the third possible implementation manner of the third aspect, in a fifth possible implementation manner of the third aspect, the operation instruction is the refresh operation instruction, and the first page is the page including the real-time transmitted resource, where the operation, which is performed by the processor, of controlling a first resource included in the first page to remain in a connected state includes:

controlling the real-time transmitted resource of the first page to remain in the connected state; and the operation, which is performed by the processor, of obtaining a second resource according to the operation instruction, and displaying the second resource includes:

updating a resource, except the real-time transmitted resource, on the first page according to the operation instruction, and displaying the updated resource and the real-time transmitted resource on the first page.

With reference to the third possible implementation manner of the third aspect, in a sixth possible implementation manner of the third aspect, the operation instruction is the refresh operation instruction, the first page is a web real-time communication page, and a media stream object of the web real-time communication page is a real-time transmitted resource, where the operation, which is performed by the processor, of controlling a first resource included in the first page to remain in a connected state includes:

controlling a peer connection media stream session connection object of the first page and the media stream object to remain in the connected state, and saving a handle of a buffer corresponding to the media stream; and the operation, which is performed by the processor, of obtaining a second resource according to the operation instruction, and displaying the second resource includes:

updating a resource, except the media stream session connection object and the media stream, on the first page according to the operation instruction, displaying the obtained resource on the first page, and assigning the handle to a video element or an audio element of the first page.

With reference to the third possible implementation manner of the third aspect, in a seventh possible implementation manner of the third aspect, the operation instruction is the hyperlink creation operation instruction, where the operation, which is performed by the processor, of controlling a first resource included in the first page to remain in a connected state includes:

controlling all resources of the first page to remain in the connected state; and the operation, which is performed by the processor, of obtaining a second resource according to the operation instruction, and displaying the second resource includes:

obtaining, according to the operation instruction, a page resource connected to a resource corresponding to the operation instruction, adding, to a page of the page resource, a parameter used for opening the page resource in a new label, and opening the page resource in the new label.

In the foregoing technical solutions, an operation instruction on a first page is received, where the operation instruction may include a page replacing instruction; and a first resource included in the first page is controlled to remain in a connected state. In this way, the first resource is not disconnected, that is, the first resource remains in a real-time updated state. Therefore, the embodiments of the present invention can improve robustness of page browsing.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
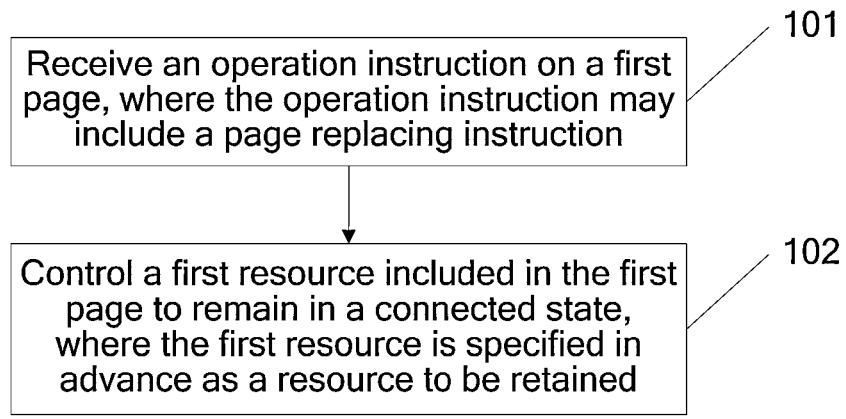
FIG. 1 is a schematic flowchart of a web page processing method according to an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a resource may be specifically an information resource used for forming a web page and defined in an Internet standard (for example, a W3C standard), and include various network data objects or services that can be identified by URIs. The resource may be represented in multiple manners, ("A network data object or service that can be identified by a URI, as defined in section 3.2. Resources may be available in multiple representations (e.g. multiple languages, data formats, size, and resolutions) or vary in other ways." Refer to RFC 2616, Section 1.3).

For example, an image resource including at least one image, a text resource including at least one character, an audio resource including at least one note, a video resource including a note, a character and/or an image, or the like. The resource may further be a page source code file, such as a Hypertext Markup Language (Hypertext Markup Language, HTML) resource file, a cascading style sheet (Cascading Style Sheet, CSS) resource file, and a JAVASCRIPT resource file. The resource may further include at least one element, where the element may be specifically a resource element that forms the resource and can be separately displayed to a user, such as text, an image, or a note. An element refers to a component of a tree structure defined by a document type definition, and the element is identified in a document instance by some descriptive symbols, usually a start-tag and an end-tag. ("A component of the hierarchical structure defined by a document type definition; it is identified in a document instance by descriptive markup, usually a start-tag and end-tag." Refer to RFC 1866, Section 2). That a first resource remains in a connected state may be that a link between a communications device and the first resource remains in the connected state. For example, when the first resource is a video resource, the communications device keeps receiving a video resource and displaying the video resource; for example, when the first resource is an audio or video communication resource, the communications device keeps receiving an audio or video communication resource sent by a server, and keeps sending a video resource collected by the communications device to the server at the same time, that is, audio or video communication remains all the time; for example, when the first resource includes all resources of a first page, the communications device keeps connected to the first page, which may also be construed as that the communications device keeps the first page open. The communications device is a device implementing a method provided by the embodiments of the present invention. The communications device may be any device that can open a page, such as a mobile phone, a computer, a tablet computer, or another communications device.

FIG. 1 is a schematic flowchart of a web page processing method according to an embodiment of the present invention. As shown in FIG. 1, the method includes:

101: Receive an operation instruction on a first page, where the operation instruction may include a page replacing instruction.

It may be that an operation instruction, which is input by a user, on the first page is received, for example, an operation instruction input by a user by tapping a touchscreen of a communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

102: Control a first resource included in the first page to remain in a connected state, where the first resource is specified in advance as a resource to be retained.

When the operation command is received, the first resource included in the first page may be controlled to remain in the connected state, that is, the first resource is controlled to remain in the connected state all the time.

Optionally, the first resource may be specifically specified in advance as a resource to be retained and be corresponding to the operation instruction. Specifically, the first resource included in the first page may further be controlled to remain in the connected state.

In this embodiment, a response may be made to the operation instruction received in step 101, or no response may be made to the operation instruction received in step 101. For example, when the first page is a page including a real-time transmitted resource, in this embodiment, a response may be made to the operation instruction received in step 101; when the transaction page and a registration page make no response to the operation instruction received in step 101. For details, refer to implementation manners described in the following embodiments.

This embodiment is applicable to a communications device, such as a mobile phone, a computer, or a tablet computer. That is, these communications devices may implement the foregoing method.

In the foregoing technical solution, an operation instruction on a first page is received, where the operation instruction may include a page replacing instruction; and a first resource included in the first page is controlled to remain in a connected state. In this way, the first resource is not disconnected, that is, the first resource remains in a real-time updated state. Therefore, the embodiment of the present invention can improve robustness of page browsing.

Figure 2:
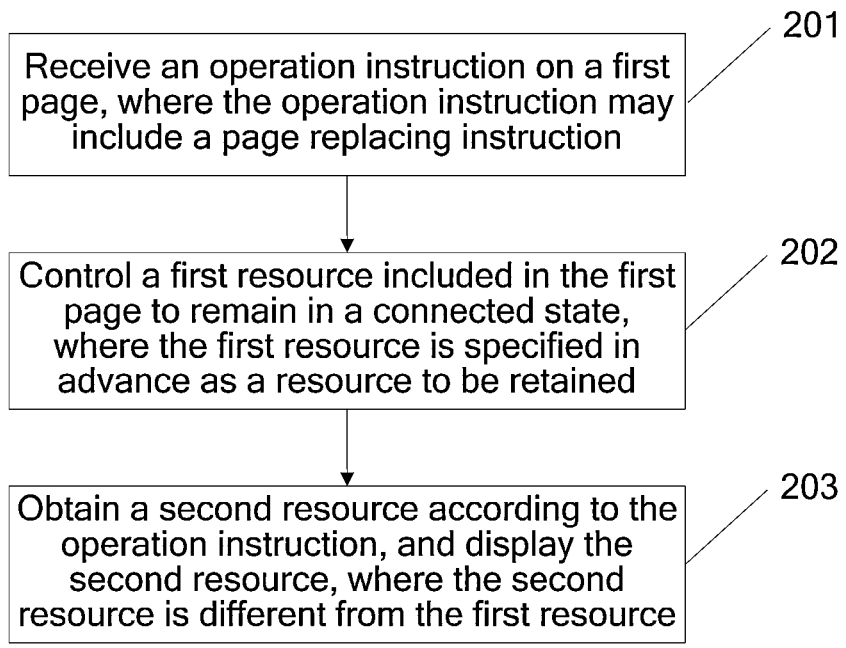
FIG. 2 is a schematic flowchart of another web page processing method according to an embodiment of the present invention.

FIG. 2 is a schematic flowchart of a web page processing method according to an embodiment of the present invention. As shown in FIG. 1, the method includes:

201: Receive an operation instruction on a first page, where the operation instruction may include a page replacing instruction.

It may be that an operation instruction, which is input by a user, on the first page is received, for example, an operation instruction input by a user by tapping a touchscreen of a communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

202: Control a first resource included in the first page to remain in a connected state, where the first resource is specified in advance as a resource to be retained.

When the operation command is received, the first resource included in the first page may be controlled to remain in the connected state, that is, the first resource is controlled to remain in the connected state all the time.

203: Obtain a second resource according to the operation instruction, and display the second resource, where the second resource is different from the first resource.

The second resource may be a resource used for being displayed on the first page, that is, in step 103, the second resource is displayed on the first page. Because an element of the first resource is in the connected state, for the displaying in step 103, the first page displays both the first resource and the second resource. For example, when the first resource is an audio or video communication resource, the first page displays that audio or video communication remains all the time, and displays the obtained second resource at the same time, where the second resource is, for example, a resource such as text, an image, or a button on the first page. The second resource may further be a page resource corresponding to a hyperlink included in the first page, that is, the first page is kept in the connected state, and at the same time, the page resource corresponding to the hyperlink included in the first page is opened, and the page resource is displayed.

This embodiment is applicable to a communications device, such as a mobile phone, a computer, or a tablet computer. That is, these communications devices may implement the foregoing method.

In the foregoing technical solution, an operation instruction on a first page is received, where the operation instruction may include a page replacing instruction; a first resource included in the first page is controlled to remain in a connected state; and a second resource is obtained according to the operation instruction, and the second resource is displayed. In this way, when the second resource is displayed, the first resource is not disconnected, that is, when the second resource is displayed, the first resource remains in a real-time updated state at the same time. Therefore, the embodiment of the present invention can improve robustness of page browsing.

Figure 3:
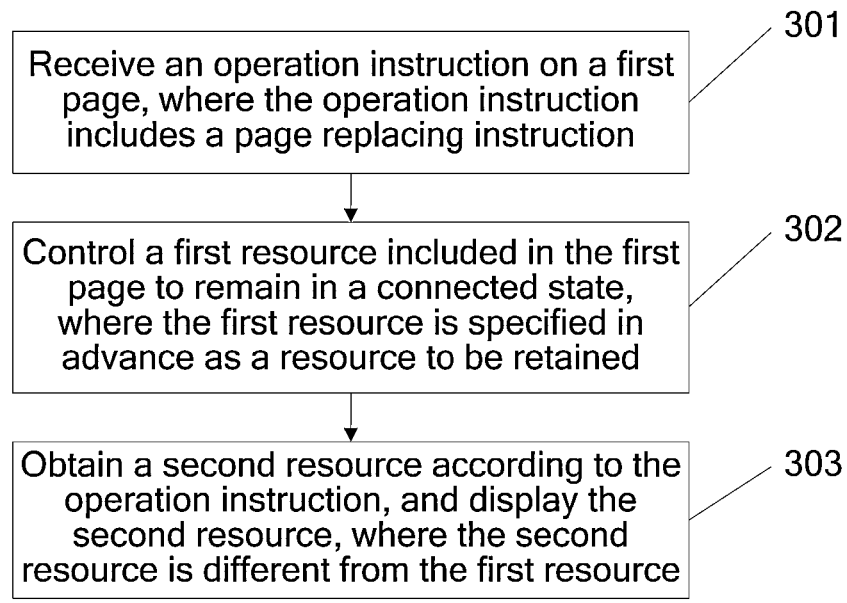
FIG. 3 is a schematic flowchart of another web page processing method according to an embodiment of the present invention.

FIG. 3 is a schematic flowchart of another web page processing method according to an embodiment of the present invention. As shown in FIG. 3, the method includes:

301: Receive an operation instruction on a first page, where the operation instruction includes a page replacing instruction.

An example is an operation instruction input by a user by tapping a touchscreen of a communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like. The operation instruction may specifically include:

a back operation instruction, a refresh operation instruction, a hyperlink creation operation instruction, or a close operation instruction.

The back operation instruction may be clicking, by a user, the back button in a browser or pressing, by a user, a back key (for example, a Backspace key) on a keyboard or another operation instruction. The refresh operation instruction may be clicking, by a user, the refresh key in a browser or pressing, by a user, a refresh key (for example, an F5 key) on a keyboard or the like. The hyperlink creation operation instruction may be an operation instruction of clicking, by a user, a hyperlink resource on the first page, for example, clicking a resource label button of a resource, such as an image hyperlink resource, a text hyperlink resource, or a video hyperlink resource, on the first page. The close operation instruction may be specifically an operation instruction of clicking a close button.

The first page may include:

a page including a real-time transmitted resource, a transaction page, and a registration page.

The page including the real-time transmitted resource may include:

a web real-time communication (Web Real-Time Communication, WebRTC) page, a page including a video, a page including audio, a page including a game, and the like.

The transaction page may include:

a page providing a payment function and a page used for selecting goods, such as an online support page or an online shopping page.

The registration page may include:

a page used for exchanging user information, for example, a user registration page.

302: Control a first resource included in the first page to remain in a connected state, where the first resource is specified in advance as a resource to be retained.

303: Obtain a second resource according to the operation instruction, and display the second resource, where the second resource is different from the first resource.

As an optional implementation manner, the operation instruction is the back operation instruction, where the controlling a first resource included in the first page to remain in a connected state may include:

controlling all resources of the first page to remain in the connected state, that is, the first resource includes all resources of the first page, and the controlling all resources of the first page to remain in the connected state may be: not closing the first page, that is, continuing to keep the first page open without performing any operation to change the first page, where the first page may be the page including the real-time transmitted resource, the transaction page, or the registration page.

Step 303 may include:

obtaining, according to the operation instruction, a page resource of a page address with a latest runtime in a window history (window.history) list of a browser running the first page, and displaying the page resource.

Obtaining the page resource may be opening the page address, for example, the page address is www.baidu.com, that is, opening the page, and displaying the page.

As an optional implementation manner, the operation instruction may further be the hyperlink creation operation instruction, where the controlling a first resource included in the first page to remain in a connected state may include:

controlling all resources of the first page to remain in the connected state, that is, the first resource includes all resources of the first page, and the controlling all resources of the first page to remain in the connected state may be: not closing the first page, and continuing to keep the first page open, where the first page may be the page including the real-time transmitted resource, the transaction page, or the registration page.

Step 303 may include:

obtaining, according to the operation instruction, a page resource connected to a resource corresponding to the operation instruction, adding, to a page of the page resource, a parameter used for opening the page resource in a new label, and opening the page resource in the new label.

The obtaining a page resource connected to a resource corresponding to the operation instruction may be opening a page corresponding to the page resource, where the hyperlink creation operation instruction may be specifically clicking a resource label button of the first page, that is, the page may be specifically a page resource obtained by clicking the resource label button of the first page. As described above, elements of all the resources of the first page are kept in the connected state, so that the page corresponding to the page resource connected to the resource corresponding to the operation instruction can be opened on a new label page. The parameter used for opening the page resource in the new label is added to the page corresponding to the page resource, so that the page corresponding to the page resource can be opened in the new label. That is, in this case, the browser opens the first page and the page corresponding to the page resource. The parameter used for opening the page resource in the new label may be a parameter "_blank".

As an optional implementation manner, the operation instruction is the refresh operation instruction, and the first page is the page including the real-time transmitted resource, that is, the first resource is the real-time transmitted resource, such as a WebRTC page, a page including a video, a page including audio, and a page including a game, where the controlling a first resource included in the first page to remain in a connected state may include:

controlling the real-time transmitted resource of the first page to remain in the connected state, for example, controlling an audio or video communication resource, a video resource, an audio resource, and a game resource to remain in the connected state. That is, the first page may further conduct audio or video communication, play a video or a video audio, or run a game.

Step 303 may include:

updating a resource, except the first resource, on the first page according to the operation instruction, and displaying the updated resource and the real-time transmitted resource on the first page.

The resource, except the real-time transmitted resource, on the first page may include a part or all of resources, except the real-time transmitted resource, on the first page. The updating a resource, except the first resource, on the first page may be: receiving a resource, except the real-time transmitted resource, on the first page and sent by a server on which the first page is located, and updating the resource on the first page by using the resource sent by the server.

The resource except the real-time transmitted resource may include:

a UI interface of a page, for example, a resource such as text, an image, a framework, and a button.

As an optional implementation manner, the operation instruction is the refresh operation instruction, the first page is the WebRTC page, and a media stream (for example, Media Stream) object of the WebRTC page is a real-time transmitted resource, where the controlling a first resource included in the first page to remain in a connected state may include:

controlling a media stream session connection object (for example, a peer connection Peer Connection) of the first page and the media stream object to remain in the connected state, and saving a handle of a buffer corresponding to the media stream.

The media stream session connection object may be specifically a communication account of the other party in real-time communication, and the media stream object may be specifically a communication platform (for example, a server) used for transmitting a media stream. The controlling a media stream session connection object of the first page and the media stream object to remain in the connected state may be keeping a connected relationship with the media stream session connection object, and keeping transmitting the media stream object with the media stream session connection object, that is, audio or video communication is in progress all the time. Specifically, Session Description Protocol (Session Description Protocol, SDP) parameters, IP port numbers, corresponding encoding resources, and corresponding decoding resources related to the media stream session connection object media stream object, and the handle of a buffer corresponding to the media stream may.

The media stream session connection object may specifically include session information for controlling establishment and transmission of the media stream, and the media stream object may specifically include actually transmitted audio and video media stream content. The media stream session connection object (RTC Peer connection object), where the media stream session connection object is defined in a WebRTC standard as follows: A media stream session connection object has an associated interactive connectivity establishment protocol (Interactive Connectivity Establishment, ICE) agent, a media stream session connection signaling state, an ICE gathering state, and an ICE connection state. All these are initialized when the media stream session connection object is created (An RTCPeerConnection object has an associated ICE agent, RTCPeerConnection signaling state, ICE gathering state, and ICE connection state. These are initialized when the object is created). In addition, one media stream session connection object has two associated stream sets. One is a local stream set, representing media streams that are currently sent by the media stream session connection object; and the other is a remote stream set, representing media streams that are currently received by the media stream session connection object from a remote end. These media stream sets are initialized when the media stream session connection object is created (An RTCPeerConnection object has two associated stream sets. A local streams set, representing streams that are currently sent, and a remote streams set, representing streams that are currently received with this RTCPeerConnection object. The stream sets are initialized to empty sets when the RTCPeerConnection object is created).

The media stream object (Media Stream Object) is defined in the WebRTC standard as follows:

Each media stream object includes zero or multiple tracks, specifically, audio tracks and video tracks. All tracks in a media stream object are synchronized when the tracks are rendered. Different media streams do not need to be synchronized (Each MediaStream object can contain zero or more tracks, in particular audio and video tracks. All tracks in a MediaStream are intended to be synchronized when rendered. Different MediaStreams do not need to be synchronized).

Step 303 may include:

updating a resource, except the media stream session connection object and the media stream, on the first page according to the operation instruction, displaying the obtained resource on the first page, and assigning the handle to a video element or an audio element of the first page.

The resource, except the media stream session connection object and the media stream, on the first page may specifically include apart or all of resources, except the media stream session connection object and the media stream, on the first page. The resource, except the media stream session connection object and the media stream, on the first page may specifically include:

an HTML resource file, a CSS resource file, a JAVASCRIPT resource file, and a button, where the button may include a button for disconnecting from a server (disconnect), a call (call) button, a hangup (hangup) button, and the like.

The assigning the handle to a video element or an audio element of the first page may be assigning, by using a webkitURL.createObjectURL(stream) method, the handle of the buffer to the video element or the audio element of the first page, and the video element or the audio element of the first page still displays the media stream object.

As an optional implementation manner, when the operation instruction is the refresh operation instruction, and the first page is the transaction page or the registration page, the controlling a first resource included in the first page to remain in a connected state includes:

controlling all resources of the first page to remain in the connected state; and in this implementation manner, step 303 may not be included, that is, when the operation instruction is received, and the first page is the transaction page or the registration page, no response is made to the operation instruction received in step 301.

As an optional implementation manner, the operation instruction is the operation instruction used for closing a page, where the controlling a first resource included in the first page to remain in a connected state includes:

controlling all resources of the first page to remain in the connected state; and step 303 may include:

obtaining, according to the operation instruction, an indication message used for indicating whether to close the first page.

It may be specifically that the indication message is obtained by using the following program code:

```
window.onbeforeunload = function( ) {
    return 'Your operation may cause the current call
to be disconnected. Close the page or not?';
}
```

That is, the indication message may include words like "Your operation may cause the current call to be disconnected. Close the page or not"; in addition, the indication message may further include a button used for closing the first page, and the indication message may further include a button used for canceling the operation instruction. When a user clicks the button used for closing the first page, the first page is closed; and when the user clicks the button used for canceling the operation instruction, the first page continues to be opened.

The program code may be specifically JAVASCRIPT code. "window" may refer to a browser window object; "onbeforeunload" may be an event processor in the window object, triggered when a page is closed or refreshed; and "function( ){return 'XXX';}" may be a function, used for returning a character string of indication information. A function of the entire section of program code is that a text prompting dialog box pops up when a user closes or refreshes a page.

Figure 4:
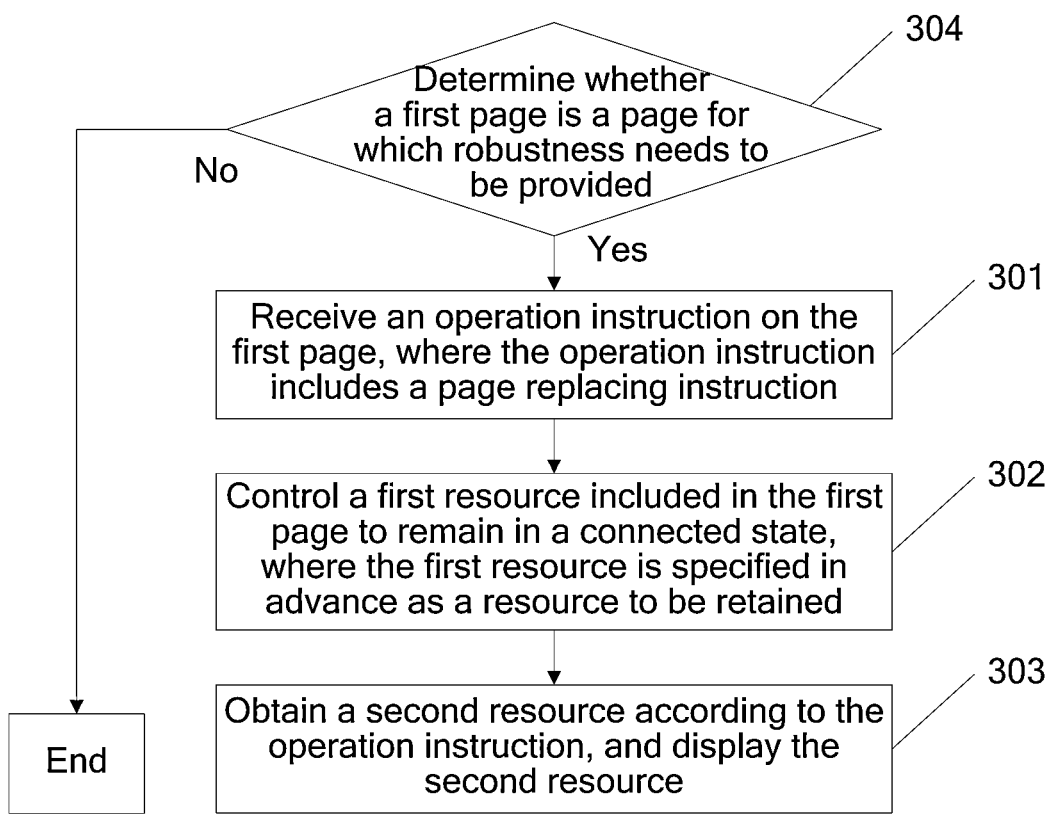
FIG. 4 is a schematic flowchart of another web page processing method according to an embodiment of the present invention.

As an optional implementation manner, as shown in FIG. 4, before step 301, the method may further include:

304: Determine whether the first page is a page for which robustness needs to be provided; and if yes, perform step 301, and if not, end the procedure.

The page for which robustness needs to be provided may include:

a page including a real-time transmitted resource, a transaction page, and a registration page.

The determining whether the first page is a page for which robustness needs to be provided may include:

determining whether both a JAVASCRIPT resource file and an HTML resource file of the first page include a section of code "new RTC Peer Connection (configuration)", and if yes, determining that the first page is a WebRTC page. Because a WebRTC page is a page including a real-time transmitted resource, it is determined that the first page is a page for which robustness needs to be provided.

"new RTC Peer Connection (configuration)" may be specifically creating an instance of an RTC peer connection, so as to assist subsequent establishment of a media channel.

In an actual application, it is generally "pc=new RTC Peer Connection(configuration);", so as to indicate that the page is a WebRTC page.

After it is determined that the first page is a WebRTC page, before a page robustness mode is entered, the method may further include:

determining whether the first page starts audio or video communication; and if yes, entering the page robustness mode, and if not, continuing to perform the step of determining whether the first page starts audio or video communication, where the determining that the first page starts audio or video communication may include:

monitoring an "addstream" event, and when the event is captured (or the event is thrown), determining that a WebRTC media stream is received, that is, determining that the first page starts audio or video communication; or monitoring an "addstream( )" method, and when the method is invoked, determining that sending of a WebRTC media stream is started, that is, determining that the first page starts audio or video communication; or monitoring a "datachannel" event, and when the event is captured (or the event is thrown), determining that a non-media data channel is already established, that is, determining that the first page starts audio or video communication.

The "addstream" event, the "addstream( )" method, and the "datachannel" event are all known events or methods in an Internet standard (for example, a W3C standard).

In this implementation manner, the determining whether the first page is a page for which robustness needs to be provided may include:

determining whether both a JAVASCRIPT resource file and an HTML resource file of the first page include an "HTML5 <video>/<audio>" tag, and if yes, determining that the first page includes a video resource or includes an audio resource, that is, determining that the first page is the page including the real-time transmitted resource.

In this implementation manner, the determining whether the first page is a page for which robustness needs to be provided may include:

determining whether both a JAVASCRIPT resource file and an HTML resource file of the first page include JS code related to online payment, and if yes, determining that the first page is an online payment page, that is, determining that the first page is the transaction page.

The determining whether the first page is a page for which robustness needs to be provided may include:

determining whether both a JAVASCRIPT resource file and an HTML resource file of the first page include an html tag and code for online registration, and if yes, determining that the first page is an online registration page, that is, determining that the first page is the registration page.

The determining whether the first page is a page for which robustness needs to be provided may include:

determining whether both a JAVASCRIPT resource file and an HTML resource file of the first page include a registration identifier of an online game or a registration identifier of another web application (Web Application), and if yes, determining that the first page is an online game page or an online application page, that is, determining that the first page is the page including the real-time transmitted resource.

In this implementation manner, after the page robustness mode is entered, step 201 may be performed.

In the foregoing technical solutions, the various implementation manners described based on the foregoing embodiments focus on how to control a first resource included in a first page to remain in a connected state when a received operation instruction is separately a back operation instruction, a refresh operation instruction, a hyperlink creation operation instruction, and a close operation instruction, and on obtaining a second resource according to the operation instruction, and displaying the second resource. All these implementation manners can improve robustness of page browsing.

The following are apparatus embodiments of the present invention. The apparatus embodiments of the present invention are used to execute the methods according to Embodiment 1, Embodiment 2, and Embodiment 3 of the method the present invention. For ease of description, only parts related to the embodiments of the present invention are shown. For undisclosed technical details, refer to Embodiment 1, Embodiment 2, and Embodiment 3 of the present invention.

Figure 5:
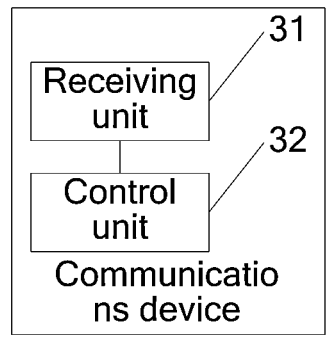
FIG. 5 is a schematic structural diagram of a communications device according to an embodiment of the present invention.

FIG. 5 is a schematic structural diagram of a communications device according to an embodiment of the present invention. As shown in FIG. 5, the communications device includes: a receiving unit 31 and a control unit 32.

The receiving unit 31 is configured to receive an operation instruction on a first page, where the operation instruction may include a page replacing instruction.

The receiving unit 31 may receive an operation instruction, which is input by a user, on the first page, for example, an operation instruction input by a user by tapping a touchscreen of the communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

The control unit 32 is configured to control a first resource included in the first page to remain in a connected state, where the first resource is specified in advance as a resource to be retained.

When the operation command is received, the first resource included in the first page may be controlled to remain in the connected state, that is, the first resource is controlled to remain in the connected state all the time.

In this embodiment, a response may be made to the operation instruction received by the receiving unit 31, or no response may be made to the operation instruction received by the receiving unit 31. For example, when the first page is a page including a real-time transmitted resource, in this embodiment, a response may be made to the operation instruction received by the receiving unit 31; when the transaction page and a registration page make no response to the operation instruction received by the receiving unit 31. For details, refer to implementation manners described in the following embodiments.

The device provided in this embodiment may be a communications device such as a mobile phone, a computer, or a tablet computer. That is, these communications devices can implement the foregoing solution.

In the foregoing technical solution, an operation instruction on a first page is received, where the operation instruction may include a page replacing instruction; and a first resource included in the first page is controlled to remain in a connected state. In this way, the first resource is not disconnected, that is, the first resource remains in a real-time updated state. Therefore, the embodiment of the present invention can improve robustness of page browsing.

Figure 6:
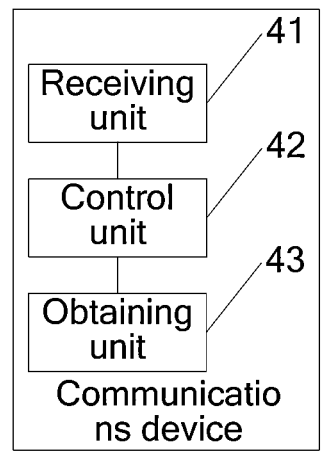
FIG. 6 is a schematic structural diagram of another communications device according to an embodiment of the present invention.

FIG. 6 is a schematic structural diagram of a communications device according to an embodiment of the present invention. As shown in FIG. 6, the communications device includes: a receiving unit 41, a control unit 42, and an obtaining unit 43.

The receiving unit 41 is configured to receive an operation instruction on a first page, where the operation instruction may include a page replacing instruction.

The receiving unit 41 may be specifically configured to receive an operation instruction, which is input by a user, on the first page, for example, an operation instruction input by a user by tapping a touchscreen of the communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

The control unit 42 is configured to control, according to the operation instruction, a first resource included in the first page to remain in a connected state, where the first resource is specified in advance as a resource to be retained.

When the operation command is received, the first resource included in the first page may be controlled to remain in the connected state, that is, the first resource is controlled to remain in the connected state all the time.

The obtaining unit 43 is configured to obtain a second resource according to the operation instruction, and display the second resource, where the second resource is different from the first resource.

The second resource may be a resource used for being displayed on the first page, that is, the obtaining unit 43 displays the second resource on the first page. Because an element of the first resource is in the connected state, when the obtaining unit 43 performs displaying, the first page displays both the first resource and the second resource. For example, when the first resource is an audio or video communication resource, the first page displays that the audio or video communication remains all the time, and displays the obtained second resource at the same time, where the second resource is, for example, a resource such as text, an image, or a button on the first page. The second resource may further be a page resource corresponding to a hyperlink included in the first page, that is, the first page is kept in the connected state, and at the same time, the page resource corresponding to the hyperlink included in the first page is opened, and the page resource is displayed.

The communications device provided in this embodiment may be a mobile phone, a computer, a tablet computer, or another communications device.

In the foregoing technical solution, an operation instruction on a first page is received, where the operation instruction may include a page replacing instruction; a first resource included in the first page is controlled to remain in a connected state; and a second resource is obtained according to the operation instruction, and the second resource is displayed. In this way, when the second resource is displayed, the first resource is not disconnected; that is, when the second resource is displayed, the first resource remains in a real-time updated state at the same time. Therefore, the embodiment of the present invention can improve robustness of page browsing.

Figure 7:
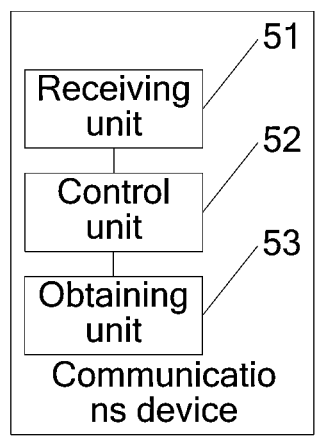
FIG. 7 is a schematic structural diagram of another communications device according to an embodiment of the present invention.

FIG. 7 is a schematic structural diagram of another communications device according to an embodiment of the present invention. As shown in FIG. 7, the communications device includes: a receiving unit 51, a control unit 52, and an obtaining unit 53.

The receiving unit 51 is configured to receive an operation instruction on a first page, where the operation instruction may include a page replacing instruction.

An example is an operation instruction input by a user by tapping a touchscreen of the communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like. The operation instruction may specifically include:

a back operation instruction, a refresh operation instruction, a hyperlink creation operation instruction, or a close operation instruction.

The back operation instruction may be clicking, by a user, the back button in a browser or pressing, by a user, a back key (for example, a Backspace key) on a keyboard or another operation instruction. The refresh operation instruction may be clicking, by a user, the refresh key in a browser or pressing, by a user, a refresh key (for example, an F5 key) on a keyboard or the like. The hyperlink creation operation instruction may be an operation instruction of clicking, by a user, a hyperlink resource on the first page, for example, clicking a resource label button of a resource, such as an image hyperlink resource, a text hyperlink resource, or a video hyperlink resource, on the first page. The close operation instruction may be specifically an operation instruction of clicking a close button.

The first page may include:

a page including a real-time transmitted resource, a transaction page, and a registration page.

The page including the real-time transmitted resource may include:

a WebRTC page, a page including a video, a page including audio, a page including a game, and the like.

The transaction page may include:

a page providing a payment function and a page used for selecting goods, such as an online support page or an online shopping page.

The registration page may include:

a page used for exchanging user information, for example, a user registration page.

The control unit 52 is configured to control, according to the operation instruction, a first resource included in the first page to remain in a connected state, where the first resource is specified in advance as a resource to be retained.

The obtaining unit 53 is configured to obtain a second resource according to the operation instruction, and display the second resource, where the second resource is different from the first resource.

As an optional implementation manner, the operation instruction is the back operation instruction, where the control unit 52 may be further configured to control all resources of the first page to remain in the connected state, that is, the first resource includes all resources of the first page, and the controlling all resources of the first page to remain in the connected state may be: not closing the first page, that is, continuing to keep the first page open without performing any operation to change the first page, where the first page may be the page including the real-time transmitted resource, the transaction page, or the registration page.

The obtaining unit 53 may be further configured to obtain, according to the operation instruction, a page resource of a page address with a latest runtime in a window history (window.history) list of a browser running the first page, and display the page resource.

Obtaining the page resource may be opening the page address, for example, the page address is www.baidu.com, that is, opening the page, and displaying the page.

As an optional implementation manner, the operation instruction may further be the hyperlink creation operation instruction, where the control unit 52 may be further configured to control all resources of the first page to remain in the connected state, that is, the first resource includes all resources of the first page, and the controlling all resources of the first page to remain in the connected state may be: not closing the first page, and continuing to keep the first page open, where the first page may be the page including the real-time transmitted resource, the transaction page, or the registration page.

The obtaining unit 53 may be further configured to obtain, according to the operation instruction, a page resource connected to a resource corresponding to the operation instruction, add, to a page of the page resource, a parameter used for opening the page resource in a new label, and open the page resource in the new label.

The obtaining a page resource connected to a resource corresponding to the operation instruction may be opening a page corresponding to the page resource, where the hyperlink creation operation instruction may be specifically clicking a resource label button of the first page, that is, the page may be specifically a page resource obtained by clicking the resource label button of the first page. As described above, elements of all the resources of the first page are kept in the connected state; therefore, the page corresponding to the page resource connected to the resource corresponding to the operation instruction can be opened on a new label page. The parameter used for opening the page resource in the new label is added to the page corresponding to the page resource, so that the page corresponding to the page resource can be opened in the new label. That is, in this case, the browser opens the first page and the page corresponding to the page resource. The parameter used for opening the page resource in the new label may be a parameter "_blank".

As an optional implementation manner, the operation instruction is the refresh operation instruction, and the first page is the page including the real-time transmitted resource, that is, the first resource is the real-time transmitted resource, such as a WebRTC page, a page including a video, a page including audio, and a page including a game, where the control unit 52 may be further configured to control the real-time transmitted resource of the first page to remain in the connected state, for example, control an audio or video communication resource, a video resource, an audio resource, and a game resource to remain in the connected state. That is, the first page may further conduct audio or video communication, play a video or a video audio, or run a game.

The obtaining unit 53 may be further configured to update a resource, except the real-time transmitted resource, on the first page according to the operation instruction, and display the updated resource and the real-time transmitted resource on the first page.

The resource, except the real-time transmitted resource, on the first page may include a part or all of resources, except the real-time transmitted resource, on the first page. The updating a resource, except the real-time transmitted resource, on the first page may be: receiving a resource, except the real-time transmitted resource, on the first page and sent by a server on which the first page is located, and updating the resource on the first page by using the resource sent by the server.

All the resources except the real-time transmitted resource may include:

a UI interface of a page, for example, a resource such as text, an image, a framework, and a button.

As an optional implementation manner, the operation instruction is the refresh operation instruction, the first page is the WebRTC page, and a media stream (media stream) object of the WebRTC page is a real-time transmitted resource, where the control unit 52 may be further configured to control a media stream session connection object of the first page and the media stream object to remain in the connected state, and save a handle of a buffer corresponding to the media stream.

The media stream session connection object may be specifically a communication account of the other party in real-time communication, and the media stream object may be specifically a communication platform (for example, a server) used for transmitting a media stream. The controlling a media stream session connection object of the first page and the media stream object to remain in the connected state may be keeping a connected relationship with the media stream session connection object, and keeping transmitting the media stream object with the media stream session connection object, that is, audio or video communication is in progress all the time. Specifically, SDP parameters, IP port numbers, corresponding encoding resources, and corresponding decoding resources related to the media stream session connection object media stream object, and the handle of a buffer corresponding to the media stream may. The media stream session connection object may specifically include session information for controlling establishment and transmission of the media stream, and the media stream object may specifically include actually transmitted audio and video media stream content.

The obtaining unit 53 may be further configured to update a resource, except the media stream session connection object and the media stream, on the first page, display the obtained resource on the first page, and assign the handle to a video element or an audio element of the first page.

The resource, except the media stream session connection object and the media stream, on the first page may specifically include apart or all of resources, except the media stream session connection object and the media stream, on the first page. The resource, except the media stream session connection object and the media stream, on the first page may specifically include:

an HTML resource file, a CSS resource file, a JAVASCRIPT resource file, and a button, where the button may include a button for disconnecting from a server (disconnect), a call (call) button, a hangup (hangup) button, and the like.

The assigning the handle to a video element or an audio element of the first page may be assigning, by using a webkitURL.createObjectURL(stream) method, the handle of the buffer to the video element or the audio element of the first page, and the video element or the audio element of the first page still displays the media stream object.

As an optional implementation manner, when the operation instruction is the refresh operation instruction, and the first page is the transaction page or the registration page, the control unit 52 may be further configured to control all resources of the first page to remain in the connected state; and in this implementation manner, the obtaining unit 53 may not be included, that is, when the operation instruction is received, and the first page is the transaction page or the registration page, no response is made to the first.

As an optional implementation manner, the operation instruction is the operation instruction used for closing a page, where the control unit 52 may be further configured to control all resources of the first page to remain in the connected state; and the obtaining unit 53 may be further configured to obtain an indication message used for indicating whether to close the first page.

It may be specifically that the indication message is obtained by using the following program code:

```
window.onbeforeunload = function( ) {
    return 'Your operation may cause the current call
to be disconnected. Close the page or not?';
}
```

That is, the indication message may include words like "Your operation may cause the current call to be disconnected. Close the page or not"; in addition, the indication message may further include a button used for closing the first page, and the indication message may further include a button used for canceling the operation instruction. When a user clicks the button used for closing the first page, the first page is closed; and when the user clicks the button used for canceling the operation instruction, the first page continues to be opened.

The program code may be specifically JAVASCRIPT code. "window" may refer to a browser window object; "onbeforeunload" may be an event processor in the window object, triggered when a page is closed or refreshed; and "function( ){return 'XXX';}" may be a function, used for returning a character string of indication information. A function of the entire section of program code is that a text prompting dialog box pops up when a user closes or refreshes a page.

Figure 8:
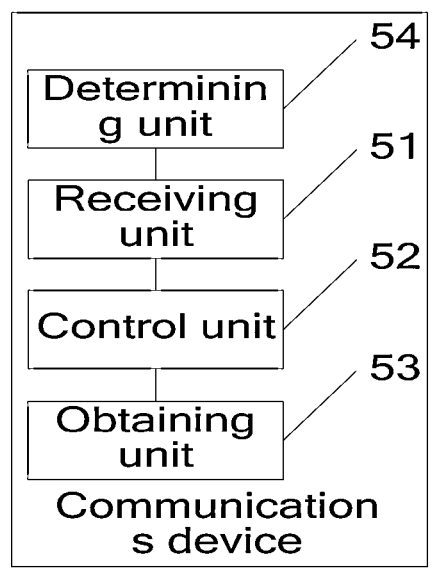
FIG. 8 is a schematic structural diagram of another communications device according to an embodiment of the present invention.

As an optional implementation manner, as shown in FIG. 8, the communications device may further include:

a determining unit 54, configured to determine whether the first page is a page for which robustness needs to be provided; and the receiving unit 51 is further configured to: when the determining unit 54 determines that the first page is a page for which robustness needs to be provided, receive the operation instruction on the first page.

The page for which robustness needs to be provided may include:

a page including a real-time transmitted resource, a transaction page, and a registration page.

The determining whether the first page is a page for which robustness needs to be provided may include:

determining whether both a JAVASCRIPT resource file and an HTML resource file of the first page include a section of code "new RTC Peer Connection (configuration)", and if yes, determining that the first page is a WebRTC page. Because a WebRTC page is a page including a real-time transmitted resource, it is determined that the first page is a page for which robustness needs to be provided.

"new RTC Peer Connection (configuration)" may be specifically creating an instance of an RTC peer connection, so as to assist subsequent establishment of a media channel. In an actual application, it is generally "pc=new RTC Peer Connection(configuration);", so as to indicate that the page is a WebRTC page.

The determining unit 54 may be further configured to: determine whether the first page is a page for which robustness needs to be provided, and if yes, determine whether the first page starts audio or video communication; and the receiving unit 51 is further configured to: when the determining unit 54 determines that the first page starts audio or video communication, receive the operation instruction on the first page, where the determining that the first page starts audio or video communication may include:

monitoring an "addstream" event, and when the event is captured (or the event is thrown), determining that a WebRTC media stream is received, that is, determining that the first page starts audio or video communication; or monitoring an "addstream( )" method, and when the method is invoked, determining that sending of a WebRTC media stream is started, that is, determining that the first page starts audio or video communication; or monitoring a "datachannel" event, and when the event is captured (or the event is thrown), determining that a non-media data channel is already established, that is, determining that the first page starts audio or video communication.

The "addstream" event, the "addstream( )" method, and the "datachannel" event are all known events or methods in an Internet standard (for example, a W3C standard).

In this implementation manner, the determining whether the first page is a page for which robustness needs to be provided may include:

determining whether both a JAVASCRIPT resource file and an HTML resource file of the first page include an "HTML5 <video>/<audio>" tag, and if yes, determining that the first page includes a video resource or includes an audio resource, that is, determining that the first page is the page including the real-time transmitted resource.

In this implementation manner, the determining whether the first page is a page for which robustness needs to be provided may include:

determining whether both a JAVASCRIPT resource file and an HTML resource file of the first page include JS code related to online payment, and if yes, determining that the first page is an online payment page, that is, determining that the first page is the transaction page.

The determining whether the first page is a page for which robustness needs to be provided may include:

determining whether both a JAVASCRIPT resource file and an HTML resource file of the first page include an html tag and code for online registration, and if yes, determining that the first page is an online registration page, that is, determining that the first page is the registration page.

The determining whether the first page is a page for which robustness needs to be provided may include:

determining whether both a JAVASCRIPT resource file and an HTML resource file of the first page include a registration identifier of an online game or a registration identifier of a web application (Web Application), and if yes, determining that the first page is an online game page or an online application page, that is, determining that the first page is the page including the real-time transmitted resource.

In the foregoing technical solutions, the various implementation manners described based on the foregoing embodiments focus on how to control a first resource included in a first page to remain in a connected state when a received operation instruction is separately a back operation instruction, a refresh operation instruction, a hyperlink creation operation instruction, and a close operation instruction, and on obtaining a second resource according to the operation instruction, and displaying the second resource. All these implementation manners can improve robustness of page browsing.

Figure 9:
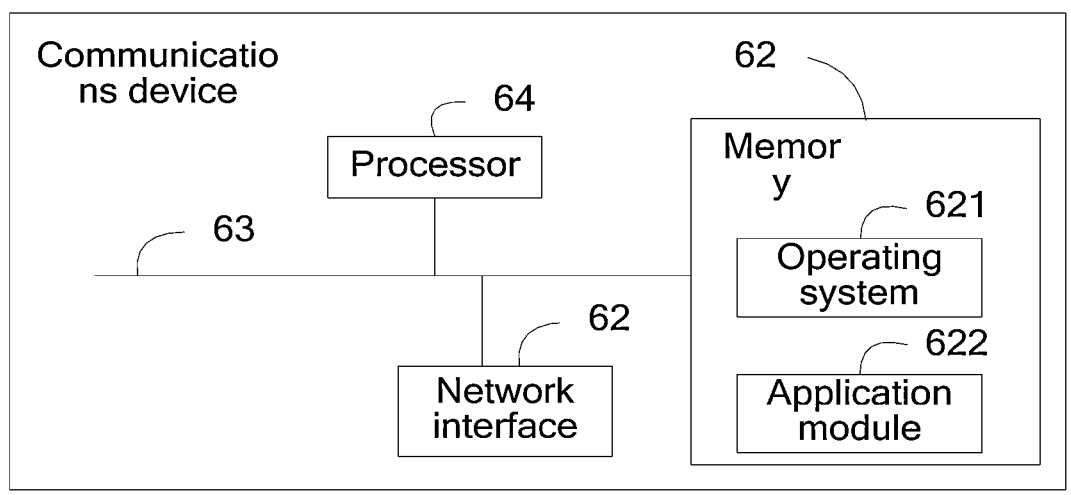
FIG. 9 is a schematic structural diagram of another communications device according to an embodiment of the present invention.

FIG. 9 is a schematic structural diagram of another communications device according to an embodiment of the present invention. As shown in FIG. 9, the communications device includes a network interface 61, a memory 62, a communications bus 63, and a processor 64 coupled to the network interface 61 and the memory 62 through the communications bus 63. The memory 62 is configured to store a group of program code. The network interface 61 may optionally include a Wi-Fi interface or another wireless interface. The memory 62 may include a high-speed RAM memory, and may further include a non-volatile memory (non-volatile memory), for example, at least one disk memory. The memory 62 may optionally include at least one storage apparatus located far away from the processor 64.

In some implementation manners, the memory 62 stores the following elements, an executable module, or a data structure, or a subset thereof, or an extended set thereof:

an operating system 621, including various system programs, configured to implement various basic services and process a hardware-based task; and an application module 622, including various application programs such as a device control service program and a device identification service program, configured to implement various application services.

Specifically, the processor 64 is configured to invoke a program stored in the memory 62, to perform the following operations:

receiving an operation instruction on a first page, where the operation instruction may include a page replacing instruction; and controlling a first resource included in the first page to remain in a connected state, where the first resource is specified in advance as a resource to be retained.

The foregoing description may be specifically that an operation instruction, which is input by a user, on the first page is received, for example, an operation instruction input by a user by tapping a touchscreen of the communications device, or an operation instruction input by a user by using an external device such as a mouse, a keyboard, or a touch device. The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

When the operation command is received, the first resource included in the first page may be controlled to remain in the connected state, that is, the first resource is controlled to remain in the connected state all the time.

In this embodiment, a response may be made to the received operation instruction, or no response may be made to the received operation instruction. For example, when the first page is a page including a real-time transmitted resource, in this embodiment, a response may be made to the received operation instruction; when the transaction page and a registration page make no response to the received operation instruction. For details, refer to implementation manners described in the following embodiments.

In this embodiment, an operation instruction on a first page is received, where the operation instruction may include a page replacing instruction; and a first resource included in the first page is controlled to remain in a connected state. In this way, the first resource is not disconnected, that is, the first resource remains in a real-time updated state. Therefore, the embodiment of the present invention can improve robustness of page browsing.

In another embodiment, the processor 64 may further perform the following operations:

receiving an operation instruction on a first page, where the operation instruction may include a page replacing instruction; and controlling a first resource included in the first page to remain in a connected state, where the first resource is specified in advance as a resource to be retained; and obtaining a second resource according to the operation instruction, and displaying the second resource, where the second resource is different from the first resource.

The obtaining a second resource may be specifically sending, through the network interface 61, a request message used for obtaining the second resource to a server, and receiving, through the network interface 61, the second resource sent by the server.

The operation instruction on the first page may be specifically an operation instruction input on the first page, or an operation instruction input on a window bar or a toolbar of a browser displaying the first page or an interface provided for input in the browser.

The page replacing instruction may be specifically used for replacing the first page with another page, where the other page may be a blank page, a previously browsed page, a refreshed page, a newly opened page, or the like.

The second resource may be a resource used for being displayed on the first page, that is, the processor 64 displays the second resource on the first page. Because an element of the first resource is in the connected state, when the processor 64 performs displaying, the first page displays both the first resource and the second resource. For example, when the first resource is an audio or video communication resource, the first page displays that audio or video communication remains all the time, and displays the obtained second resource at the same time, where the second resource is, for example, a resource such as text, an image, or a button on the first page. The second resource may further be a page resource corresponding to a hyperlink included in the first page, that is, the first page is kept in the connected state, and at the same time, the page resource corresponding to the hyperlink included in the first page is opened, and the page resource is displayed.

In this embodiment, an operation instruction on a first page is received, where the operation instruction may include a page replacing instruction; a first resource included in the first page is controlled to remain in a connected state; and a second resource is obtained according to the operation instruction, and the second resource is displayed. In this way, when the second resource is displayed, the first resource is not disconnected; that is, when the second resource is displayed, the first resource remains in a real-time updated state at the same time. Therefore, the embodiment of the present invention can improve robustness of page browsing.

In another embodiment, the processor 64 may be further configured to perform the following operations:

receiving an operation instruction on a first page, where the operation instruction includes a page replacing instruction;

controlling a first resource included in the first page to remain in a connected state, where the first resource is specified in advance as a resource to be retained; and obtaining a second resource according to the operation instruction, and displaying the second resource, where the second resource is different from the first resource.

The operation instruction on the first page may be specifically an operation instruction input on the first page, or an operation instruction input on a window bar or a toolbar of a browser displaying the first page or an interface provided for input in the browser. The page replacing instruction may be specifically used for replacing the first page with another page, where the other page may be a blank page, a previously browsed page, a refreshed page, a newly opened page, or the like. The operation instruction may specifically include:

a back operation instruction, a refresh operation instruction, a hyperlink creation operation instruction, or a close operation instruction.

The back operation instruction may be clicking, by a user, the back button in a browser or pressing, by a user, a back key (for example, a Backspace key) on a keyboard or another operation instruction. The refresh operation instruction may be clicking, by a user, the refresh key in a browser or pressing, by a user, a refresh key (for example, an F5 key) on a keyboard or the like. The hyperlink creation operation instruction may be an operation instruction of clicking, by a user, a hyperlink resource on the first page, for example, clicking a resource label button of a resource, such as an image hyperlink resource, a text hyperlink resource, or a video hyperlink resource, on the first page. The close operation instruction may be specifically an operation instruction of clicking a close button.

The first page may include:

a page including a real-time transmitted resource, a transaction page, and a registration page.

The page including the real-time transmitted resource may include:

a WebRTC page, a page including a video, a page including audio, a page including a game, and the like.

The transaction page may include:

a page providing a payment function and a page used for selecting goods, such as an online support page or an online shopping page.

The registration page may include:

a page used for exchanging user information, for example, a user registration page.

As an optional implementation manner, the operation instruction is the back operation instruction, where the operation, which is performed by the processor 64, of controlling a first resource included in the first page to remain in a connected state may include:

controlling all resources of the first page to remain in the connected state, that is, the first resource includes all resources of the first page, and the controlling all resources of the first page to remain in the connected state may be: not closing the first page, that is, continuing to keep the first page open without performing any operation to change the first page, where the first page may be the page including the real-time transmitted resource, the transaction page, or the registration page.

The operation, which is performed by the processor 64, of obtaining a second resource according to the operation instruction, and displaying the second resource may include:

obtaining, according to the operation instruction, a page resource of a page address with a latest runtime in a window.history list of a browser running the first page, and displaying the page resource.

Obtaining the page resource may be opening the page address, for example, the page address is www.baidu.com, that is, opening the page, and displaying the page.

As an optional implementation manner, the operation instruction may further be the hyperlink creation operation instruction, where the operation, which is performed by the processor 64, of controlling a first resource included in the first page to remain in a connected state may include:

controlling all resources of the first page to remain in the connected state, that is, the first resource includes all resources of the first page, and the controlling all resources of the first page to remain in the connected state may be: not closing the first page, and continuing to keep the first page open, where the first page may be the page including the real-time transmitted resource, the transaction page, or the registration page.

The operation, which is performed by the processor 64, of obtaining a second resource according to the operation instruction, and displaying the second resource may include:

obtaining, according to the operation instruction, a page resource connected to a resource corresponding to the operation instruction, adding, to a page of the page resource, a parameter used for opening the page resource in a new label, and opening the page resource in the new label.

The obtaining a page resource connected to a resource corresponding to the operation instruction may be opening a page corresponding to the page resource, where the hyperlink creation operation instruction may be specifically clicking a resource label button of the first page, that is, the page may be specifically a page resource obtained by clicking the resource label button of the first page. As described above, elements of all the resources of the first page are kept in the connected state; therefore, the page corresponding to the page resource connected to the resource corresponding to the operation instruction can be opened on a new label page. The parameter used for opening the page resource in the new label is added to the page corresponding to the page resource, so that the page corresponding to the page resource can be opened in the new label. That is, in this case, the browser opens the first page and the page corresponding to the page resource. The parameter used for opening the page resource in the new label may be a parameter "_blank".

As an optional implementation manner, the operation instruction is the refresh operation instruction, and the first page is the page including the real-time transmitted resource, that is, the first resource is the real-time transmitted resource, such as a WebRTC page, a page including a video, a page including audio, and a page including a game, where the operation, which is performed by the processor 64, of controlling a first resource included in the first page to remain in a connected state may include:

controlling the real-time transmitted resource of the first page to remain in the connected state, for example, controlling an audio or video communication resource, a video resource, an audio resource, and a game resource to remain in the connected state. That is, the first page may further conduct audio or video communication, play a video or a video audio, or run a game.

The operation, which is performed by the processor 64, of obtaining a second resource according to the operation instruction, and displaying the second resource may include:

updating a resource, except the first resource, on the first page according to the operation instruction, and displaying the updated resource and the real-time transmitted resource on the first page.

The resource, except the real-time transmitted resource, on the first page may include a part or all of resources, except the real-time transmitted resource, on the first page. The updating a resource, except the first resource, on the first page may be: receiving a resource, except the real-time transmitted resource, on the first page and sent by a server on which the first page is located, and updating the resource on the first page by using the resource sent by the server.

The resource except the real-time transmitted resource may include:

a UI interface of a page, for example, a resource such as text, an image, a framework, and a button.

As an optional implementation manner, the operation instruction is the refresh operation instruction, the first page is the WebRTC page, and a media stream (media stream) object of the WebRTC page is a real-time transmitted resource, where the operation, which is performed by the processor 64, of controlling a first resource included in the first page to remain in a connected state may include:

controlling a media stream session connection object of the first page and the media stream object to remain in the connected state, and saving a handle of a buffer corresponding to the media stream.

The media stream session connection object may be specifically a communication account of the other party in real-time communication, and the media stream object may be specifically a communication platform (for example, a server) used for transmitting a media stream. The controlling a media stream session connection object of the first page and the media stream object to remain in the connected state may be keeping a connected relationship with the media stream session connection object, and keeping transmitting the media stream object with the media stream session connection object, that is, audio or video communication is in progress all the time. Specifically, Session Description Protocol (Session Description Protocol, SDP) parameters, IP port numbers, corresponding encoding resources, and corresponding decoding resources related to the media stream session connection object media stream object, and the handle of a buffer corresponding to the media stream may. The media stream session connection object may specifically include session information for controlling establishment and transmission of the media stream, and the media stream object may specifically include actually transmitted audio and video media stream content.

The operation, which is performed by the processor 64, of obtaining a second resource according to the operation instruction, and displaying the second resource may include:

updating a resource, except the media stream session connection object and the media stream, on the first page according to the operation instruction, displaying the obtained resource on the first page, and assigning the handle to a video element or an audio element of the first page.

The resource, except the media stream session connection object and the media stream, on the first page may specifically include apart or all of resources, except the media stream session connection object and the media stream, on the first page. The resource, except the media stream session connection object and the media stream, on the first page may specifically include:

an HTML resource file, a CSS resource file, a JAVASCRIPT resource file, and a button, where the button may include a button for disconnecting from a server (disconnect), a call (call) button, a hangup (hangup) button, and the like.

The assigning the handle to a video element or an audio element of the first page may be assigning, by using a webkitURL.createObjectURL(stream) method, the handle of the buffer to the video element or the audio element of the first page, and the video element or the audio element of the first page still displays the media stream object.

As an optional implementation manner, when the operation instruction is the refresh operation instruction, and the first page is the transaction page or the registration page, the operation, which is performed by the processor 64, of controlling a first resource included in the first page to remain in a connected state may include:

controlling all resources of the first page to remain in the connected state; and in this implementation manner, the processor 64 may not perform the operation of obtaining a second resource according to the operation instruction and displaying the second resource, that is, when the operation instruction is received, and the first page is the transaction page or the registration page, no response is made to the first.

As an optional implementation manner, the operation instruction is the operation instruction used for closing a page, where the operation, which is performed by the processor 64, of controlling a first resource included in the first page to remain in a connected state may include:

controlling all resources of the first page to remain in the connected state; and the operation, which is performed by the processor 64, of obtaining a second resource according to the operation instruction, and displaying the second resource may include:

obtaining, according to the operation instruction, an indication message used for indicating whether to close the first page.

It may be specifically that the indication message is obtained by using the following program code:

```
window.onbeforeunload = function( ) {
    return 'Your operation may cause the current call
to be disconnected. Close the page or not?';
}
```

That is, the indication message may include words like "Your operation may cause the current call to be disconnected. Close the page or not"; in addition, the indication message may further include a button used for closing the first page, and the indication message may further include a button used for canceling the operation instruction. When a user clicks the button used for closing the first page, the first page is closed; and when the user clicks the button used for canceling the operation instruction, the first page continues to be opened.

The program code may be specifically JAVASCRIPT code. "window" may refer to a browser window object; "onbeforeunload" may be an event processor in the window object, triggered when a page is closed or refreshed; and "function( ){return 'XXX';}" may be a function, used for returning a character string of indication information. A function of the entire section of program code is that a text prompting dialog box pops up when a user closes or refreshes a page.

As an optional implementation manner, before receiving the operation instruction, the processor 64 may be further configured to perform the following operation:

determining whether the first page is a page for which robustness needs to be provided; and if yes, performing the operation of receiving an operation instruction on a first page, and if not, ending the procedure.

The page for which robustness needs to be provided may include:

a page including a real-time transmitted resource, a transaction page, and a registration page.

The determining whether the first page is a page for which robustness needs to be provided may include:

determining whether both a JAVASCRIPT resource file and an HTML resource file of the first page include a section of code "new RTC Peer Connection (configuration)", and if yes, determining that the first page is a WebRTC page. Because a WebRTC page is a page including a real-time transmitted resource, it is determined that the first page is a page for which robustness needs to be provided.

"new RTC Peer Connection (configuration)" may be specifically creating an instance of an RTC peer connection, so as to assist subsequent establishment of a media channel. In an actual application, it is generally "pc=new RTC Peer Connection(configuration);", so as to indicate that the page is a WebRTC page.

After it is determined that the first page is a WebRTC page, before a page robustness mode is entered, the method may further include:

determining whether the first page starts audio or video communication; and if yes, entering the page robustness mode, and if not, continuing to perform the step of determining whether the first page starts audio or video communication, where the determining that the first page starts audio or video communication may include:

monitoring an "addstream" event, and when the event is captured (or the event is thrown), determining that a WebRTC media stream is received, that is, determining that the first page starts audio or video communication; or monitoring an "addstream( )" method, and when the method is invoked, determining that sending of a WebRTC media stream is started, that is, determining that the first page starts audio or video communication; or monitoring a "datachannel" event, and when the event is captured (or the event is thrown), determining that a non-media data channel is already established, that is, determining that the first page starts audio or video communication.

The "addstream" event, the "addstream( )" method, and the "datachannel" event are all known events or methods in an Internet standard (for example, a W3C standard).

In this implementation manner, the determining whether the first page is a page for which robustness needs to be provided may include:

determining whether both a JAVASCRIPT resource file and an HTML resource file of the first page include an "HTML6 <video>/<audio>" tag, and if yes, determining that the first page includes a video resource or includes an audio resource, that is, determining that the first page is the page including the real-time transmitted resource.

In this implementation manner, the determining whether the first page is a page for which robustness needs to be provided may include:

determining whether both a JAVASCRIPT resource file and an HTML resource file of the first page include JS code related to online payment, and if yes, determining that the first page is an online payment page, that is, determining that the first page is the transaction page.

The determining whether the first page is a page for which robustness needs to be provided may include:

determining whether both a JAVASCRIPT resource file and an HTML resource file of the first page include an html tag and code for online registration, and if yes, determining that the first page is an online registration page, that is, determining that the first page is the registration page.

The determining whether the first page is a page for which robustness needs to be provided may include:

determining whether both a JAVASCRIPT resource file and an HTML resource file of the first page include a registration identifier of an online game or a registration identifier of a web application (Web Application), and if yes, determining that the first page is an online game page or an online application page, that is, determining that the first page is the page including the real-time transmitted resource.

In this implementation manner, after the page robustness mode is entered, the processor 64 may receive the operation instruction on the first page.

In this embodiment, the various implementation manners described based on the foregoing embodiments focus on how to control a first resource included in a first page to remain in a connected state when a received operation instruction is separately a back operation instruction, a refresh operation instruction, a hyperlink creation operation instruction, and a close operation instruction, and on obtaining a second resource according to the operation instruction, and displaying the second resource. All these implementation manners can improve robustness of page browsing.

The communications device may be a communications device such as a mobile phone, a computer, or a tablet computer. That is, these communications devices can implement the foregoing solution.

In the foregoing technical solution, an operation instruction on a first page is received, where the operation instruction may include a back operation instruction or a refresh operation instruction; and a first resource included in the first page is controlled to remain in a connected state. In this way, the first resource is not disconnected, that is, the first resource remains in a real-time updated state. Therefore, the embodiment of the present invention can improve robustness of page browsing.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

Disclosed above are only exemplary embodiments of the present invention, which are certainly not intended to limit the protection scope of the present invention. Therefore, any equivalent variation made according to the claims of the present invention shall still fall within the scope of the present invention.

What is claimed is:

1. A web page processing method, comprising:
    playing a real-time transmitted resource in a first web page of a web browser on an electronic device;
    receiving a first operation instruction on the first web page, wherein the first operation instruction comprises one of a plurality of instructions, wherein a first one of the plurality of instructions comprises a back operation that causes the web browser to display a previous web page, and wherein a second one of the plurality of instructions comprises a refresh operation that causes content of the first web page to be re-loaded;
    controlling a communication link between the real-time transmitted resource and the electronic device to remain in a connected state in response to receiving the first operation instruction, wherein the real-time transmitted resource continues to be played in the first web page of the web browser on the electronic device in response to receiving the first operation instruction, wherein the real-time transmitted resource is specified in advance as a resource to be retained, wherein the real-time transmitted resource is retained while the first operation instruction is received, and wherein the communication link is established before the first operation instruction is received;
    refreshing all items on the first web page except the real-time transmitted resource, wherein the real-time transmitted resource is not re-loaded when refreshing the first web page;
    receiving a second operation instruction on a second page that is loaded after the first web page, wherein the second operation instruction comprises an instruction to stop the real-time transmitted resource; and
    providing an indication message that prompts a user that the communication link between the real-time transmitted resource and the electronic device will be disconnected in response to continuing to process the second operation instruction.

2. The web page processing method of claim 1, wherein after controlling the communication link between the real-time transmitted resource and the electronic device to remain in the connected state, the web page processing method further comprises:
    obtaining a second resource according to the first operation instruction; and
    displaying the second resource, wherein the second resource is different from the real-time transmitted resource.

3. The web page processing method of claim 1, wherein controlling the communication link between the real-time transmitted resource and the electronic device to remain in the connected state comprises:
    controlling all resources of the first web page to remain in the connected state;
    obtaining a second resource according to the first operation instruction; and
    displaying the second resource by:
        obtaining, according to the first operation instruction, a page resource of a page address with a latest runtime in a window history list of a browser running the first web page; and
        displaying the page resource.

4. The web page processing method of claim 1, wherein controlling the communication link between the real-time transmitted resource and the electronic device to remain in the connected state comprises:
    controlling the real-time transmitted resource of the first web page to remain in the connected state;
    obtaining a second resource according to the first operation instruction; and
    displaying the second resource by:
        updating the second resource according to the first operation instruction; and
        displaying the second resource and the real-time transmitted resource on the first web page, wherein the second resource is a resource that is not the real-time transmitted resource on the first web page.

5. The web page processing method of claim 1, wherein controlling the communication link between the real-time transmitted resource and the electronic device to remain in the connected state comprises:
   controlling all resources of the first web page to remain in the connected state;
   obtaining a second resource according to the first operation instruction; and
   displaying the second resource by:
      obtaining, according to the first operation instruction, a page resource connected to a resource corresponding to the first operation instruction;
      adding, to a page of the page resource, a parameter used for opening the page resource in a new label; and
      opening the page resource in the new label.

6. The web page processing method of claim 1, further comprising displaying a virtual key in the web browser, wherein receiving the first operation instruction comprises receiving an indication that the virtual key in the web browser is pressed.

7. The web page processing method of claim 1, further comprising configuring a key on a keyboard as a refresh key, wherein receiving the first operation instruction comprises receiving an indication that the refresh key is pressed.

8. A communications device, comprising:
   a network interface;
   a memory;
   a communications bus; and
   a processor coupled to the network interface and the memory through the communications bus, wherein the memory is configured to store instructions that, when executed by the processor, cause the communications device to be configured to:
      play a real-time transmitted resource in a first web page of a web browser on the communications device;
      receive a first operation instruction on the first web page, wherein the first operation instruction comprises one of a plurality of instructions, wherein a first one of the plurality of instructions comprises a back operation that causes the web browser to display a previous web page, and wherein a second one of the plurality of instructions comprises a refresh operation that causes content of the first web page to be re-loaded;
      control a communication link between the real-time transmitted resource and the communications device to remain in a connected state in response to receiving the first operation instruction, wherein the real-time transmitted resource continues to be played in the first web page of the web browser of the communications device in response to receiving the first operation instruction, wherein the real-time transmitted resource is specified in advance as a resource to be retained, wherein the real-time transmitted resource is retained while the first operation instruction is received, and wherein the communication link is established before the first operation instruction is received;
      refresh all items on the first web page except the real-time transmitted resource, wherein the real-time transmitted resource is not re-loaded when refreshing the first web page;
      receive a second operation instruction on a second page that is loaded after the first web page, wherein the second operation instruction comprises an instruction to stop the real-time transmitted resource; and
      provide an indication message that prompts a user that the communication link between the real-time transmitted resource and the communication device will be disconnected in response to continuing to process the second operation instruction.

9. The communications device of claim 8, wherein the memory further comprises instructions that, when executed by the processor, cause the communications device to be configured to:
   obtain a second resource according to the first operation instruction after controlling the communication link between the real-time transmitted resource and the communication device to remain in the connected state; and
   display the second resource, wherein the second resource is different from the real-time transmitted resource.

10. The communications device of claim 8, wherein the memory further comprises instructions that, when executed by the processor, cause the communications device to be configured to:
   control all resources of the first web page to remain in the connected state;
   obtain, according to the first operation instruction, a page resource of a page address with a latest runtime in a window history list of a browser running the first web page; and
   display the page resource.

11. The communications device of claim 8, wherein the first web page comprises the real-time transmitted resource, and wherein the memory further comprises instructions that, when executed by the processor, cause the communications device to be configured to:
   control the real-time transmitted resource of the first web page to remain in the connected state;
   update a resource that is not the real-time transmitted resource on the first web page according to the first operation instruction; and
   display the resource and the real-time transmitted resource on the first web page.

12. The communications device of claim 8, wherein the memory further comprises instructions that, when executed by the processor, cause the communications device to be configured to:
   control all resources of the first web page to remain in the connected state;
   obtain, according to the first operation instruction, a page resource connected to a resource corresponding to the first operation instruction;
   add, to a page of the page resource, a parameter used for opening the page resource in a new label; and
   open the page resource in the new label.

13. A computer program product comprising computer-executable instructions for storage on a non-transitory computer-readable medium that, when executed by a processor, cause an apparatus to:
   play a real-time transmitted resource in a first web page of a web browser on the apparatus;
   receive a first operation instruction on the first web page, wherein the first operation instruction comprises one of a plurality of instructions, wherein a first one of the plurality of instructions comprises a back operation that causes the web browser to display a previous web page, and wherein a second one of the plurality of instructions comprises a refresh operation that causes content of the first web page to be re-loaded;
   control a communication link between the real-time transmitted resource and the apparatus to remain in a connected state in response to receiving the first operation instruction, wherein the real-time transmitted resource continues to be played in the first web page of the web browser on the apparatus in response to receiving the first operation instruction, wherein the real-time transmitted resource is specified in advance as a resource to be retained, wherein the real-time transmitted resource is retained while the first operation instruction is received, and wherein the communication link is established before the first operation instruction is received;

refresh all items on the first web page except the real-time transmitted resource, wherein the real-time transmitted resource is not re-loaded when refreshing the first web page;

receive a second operation instruction on a second page that is loaded after the first web page, wherein the second operation instruction comprises an instruction to stop the real-time transmitted resource; and provide an indication message that prompts a user that the communication link between the real-time transmitted resource and the apparatus will be disconnected in response to continuing to process the second operation instruction.

14. The computer program product of claim 13, wherein the computer-executable instructions further cause the apparatus to disconnect the communication link between the real-time transmitted resource and the apparatus in response to receiving a confirmation input from the user.

15. The computer program product of claim 13, wherein the computer-executable instructions further cause the apparatus to maintain the communication link between the real-time transmitted resource and the apparatus in response to receiving a cancellation input from the user.

16. The computer program product of claim 13, wherein the real-time transmitted resource comprises an audio stream.

17. The computer program product of claim 13, wherein the real-time transmitted resource comprises a video stream.

18. The computer program product of claim 13, wherein the real-time transmitted resource comprises both an audio stream and a video stream.

19. The computer program product of claim 18, wherein the computer-executable instructions further cause the apparatus to synchronize the audio stream and the video stream.

\* \* \* \* \*